United States Patent
Cheng et al.

(10) Patent No.: US 8,774,506 B2
(45) Date of Patent: Jul. 8, 2014

(54) METHOD OF DETECTING RED EYE IMAGE AND APPARATUS THEREOF

(75) Inventors: Ting-Yuan Cheng, Taipei (TW); Pai-Yu Tien, Taipei (TW); Sheng-Ling Huang, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 558 days.

(21) Appl. No.: 12/886,572

(22) Filed: Sep. 21, 2010

(65) Prior Publication Data

US 2011/0274347 A1    Nov. 10, 2011

(30) Foreign Application Priority Data

May 7, 2010 (TW) ................................ 99114610 A

(51) Int. Cl.
*G06K 9/00* (2006.01)
(52) U.S. Cl.
USPC ............ 382/167; 382/117; 382/165; 358/518
(58) Field of Classification Search
USPC .................... 382/117, 165, 167; 358/518
See application file for complete search history.

(56) References Cited

U.S. PATENT DOCUMENTS

| | | | |
|---|---|---|---|
| 6,912,298 B1 * | 6/2005 | Wilensky | 382/117 |
| 7,782,401 B1 * | 8/2010 | Chou | 348/581 |
| 2004/0046878 A1 * | 3/2004 | Jarman | 348/239 |
| 2004/0114829 A1 * | 6/2004 | LeFeuvre et al. | 382/275 |
| 2004/0258308 A1 * | 12/2004 | Sadovsky et al. | 382/190 |
| 2009/0087042 A1 * | 4/2009 | Steinberg et al. | 382/118 |
| 2009/0226033 A1 * | 9/2009 | Sefcik | 382/103 |

* cited by examiner

*Primary Examiner* — Chan Park
*Assistant Examiner* — Eueng-Nan Yeh
(74) *Attorney, Agent, or Firm* — Winston Hsu; Scott Margo

(57) ABSTRACT

A redeye image detection method for detecting at least one redeye image in an input image includes: deriving an edge detection result by performing an edge detection process to detect an edge characteristic of the input image; deriving a red pixel detection result by performing a red pixel detection process to detect red pixels in the input image, and utilizing a determining circuit to derive a preliminary detection result according to the edge detection result and the red pixel detection result, and derive the redeye image according to the preliminary detection result.

10 Claims, 10 Drawing Sheets

METHOD OF DETECTING RED EYE IMAGE AND APPARATUS THEREOF

BACKGROUND OF THE INVENTION

1. Field of the Invention

The present invention relates to redeye image detection, and more particularly, to a detection method and a related apparatus capable of detecting at least one redeye image within an input image easily and quickly.

2. Description of the Prior Art

Human pupils will enlarge in a dark environment so as to collect as much light as possible, and therefore enable a recognizable image to be projected on the retina. However, when a camera flashlight is triggered in the dark environment, intense light will run through the pupil, reflecting the color of the veins behind the retina, which leads to a 'redeye' effect when the image is formed on film.

For general image capture apparatus, redeye image detection is an attached function that ensures a redeye image can be modified when an image is formed. General redeye detection will first detect a human face, then detect whether red eye images occur on both eyes of the human face, and finally perform compensation for the derived redeye images. However, there may be no complete human face in the captured image, or only one complete eye or one partial eye appears in the captured image. The aforementioned conditions may lead to a malfunction of the conventional red eye image detection and therefore a correct image cannot be achieved. In addition, in order to derive a facial image in advance, a conventional image capture apparatus is required to perform multiple tedious computations (e.g., processes such as complexion determination, etc.) to derive the desired facial image correctly; these computation processes also increase the complexity of the overall system. Moreover, as the conventional capture apparatus only performs redeye detection for human eyes, images with animal eyes cannot be correctly detected and compensated for properly.

SUMMARY OF THE INVENTION

To solve the aforementioned problems, the present invention utilizes red pixel and edge detection techniques simultaneously to provide a detection method and a related apparatus capable of detecting at least one redeye image within an input image easily and quickly.

According to an embodiment of the present invention, an exemplary redeye image detection method for detecting at least one red eye image in an input image is provided. The exemplary redeye image detection method comprises: deriving an edge detection result by performing an edge detection process to detect an edge characteristic of the input image, deriving a red pixel detection result by performing a red pixel detection process to detect red pixels in the input image, and utilizing a determining circuit to derive a preliminary detection result according to the edge detection result and the red pixel detection result, and derive the redeye image according to the preliminary detection result.

According to an embodiment of the present invention, an exemplary redeye image detection apparatus for detecting at least one red eye image in an input image is provided. The exemplary redeye image detection apparatus comprises an edge detection circuit, a red pixel detection circuit and a determining circuit. The edge detection circuit is coupled to the input image for performing an edge detection process to detect an edge characteristic of the input image and accordingly deriving an edge detection result. The red pixel detection circuit is coupled to the input image, and is for performing a red pixel detection process to detect red pixels in the input image and accordingly deriving a red pixel detection result. The determining circuit is coupled to the edge detection circuit and the red pixel detection circuit, and is for deriving a preliminary detection result according to the edge detection result and the red pixel detection result, and deriving the redeye image according to the preliminary detection result.

These and other objectives of the present invention will no doubt become obvious to those of ordinary skill in the art after reading the following detailed description of the preferred embodiment that is illustrated in the various figures and drawings.

DETAILED DESCRIPTION

The present invention utilizes red pixel and edge detection techniques simultaneously to thereby detect at least one redeye image within an input image easily and quickly. The operation thereof is detailed as follows.

Figure 1:
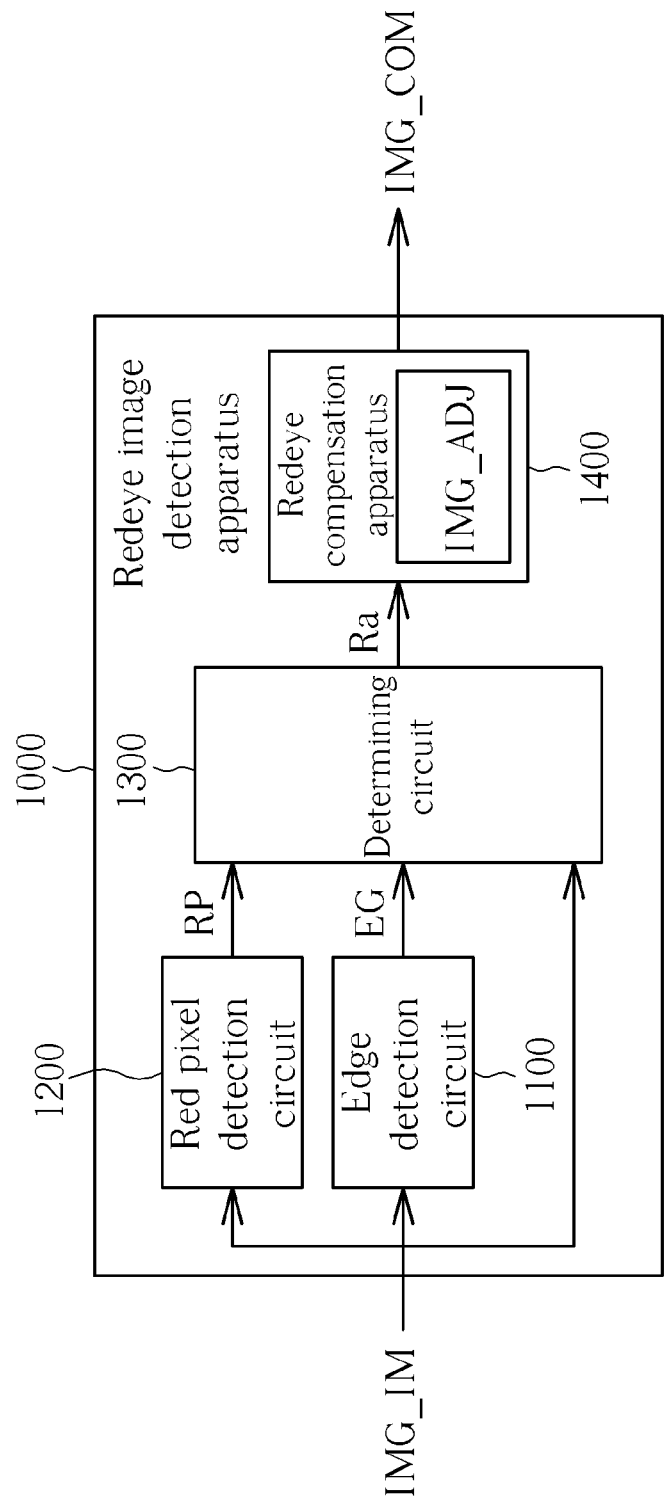
FIG. 1 is a diagram of a redeye image detection apparatus according to an embodiment of the present invention.

FIG. 1 is a diagram of a redeye image detection apparatus 1000 according to an embodiment of the present invention. The redeye image detection apparatus 1000 includes (but is not limited to) an edge detection circuit 1100, a red pixel detection circuit 1200, a determining circuit 1300 and a redeye compensation circuit 1400. Since a pupil and iris are surrounded by the white of the eye, the images of pupils and irises have very strong edge characteristics, i.e., the pixels within the images of pupils and irises have a very large luminance difference with respect to pixels surrounding them, resulting in intense contrast. Based on the edge characteristics, the edge detection circuit 1100 will perform an edge detection process for an input image IMG_IN after receiving the image, and derive an edge detection result EG by detecting the edge characteristics of the input image IMG_IN. In addition, the red pixel detection circuit 1200 also receives the input image IMG_IN, and performs a red pixel detection process to detect red pixels in the input image IMG_IN and accordingly derives a red pixel detection result RP. The determining circuit 1300 is coupled to the edge detection circuit 1100 and the red pixel detection circuit 1200, and is for deriving a detection result Ra according to the edge detection result EG and the red pixel detection result RP, and deriving the at least one redeye image according to the detection result Ra. Finally, the redeye compensation apparatus 1400 will receive the detection result Ra and adjust the red eye image according to a luminance value of the red eye image to accordingly derive an adjusted red eye image IMG_ADJ, and filter the adjusted red eye image IMG_ADJ to derive a compensated red eye image IMG_COM.

Please note that, in this embodiment, the redeye compensation apparatus 1400 will further compensate the input image IMG_IN and output the compensated redeye image IMG_COM. However, in other embodiments, the redeye detection apparatus 1000 can also output the detection result Ra directly, and then users can determine whether to process the detected redeye image or not according to specific requirements. Therefore, the redeye compensation apparatus 1400 is not necessarily required in the redeye detection apparatus 1000 (i.e., the redeye compensation apparatus 1400 is an optional element). In short, those methods/apparatus utilizing red pixel and edge detection techniques simultaneously to derive a redeye image within an input image fall within the scope of the present invention.

Figure 2:
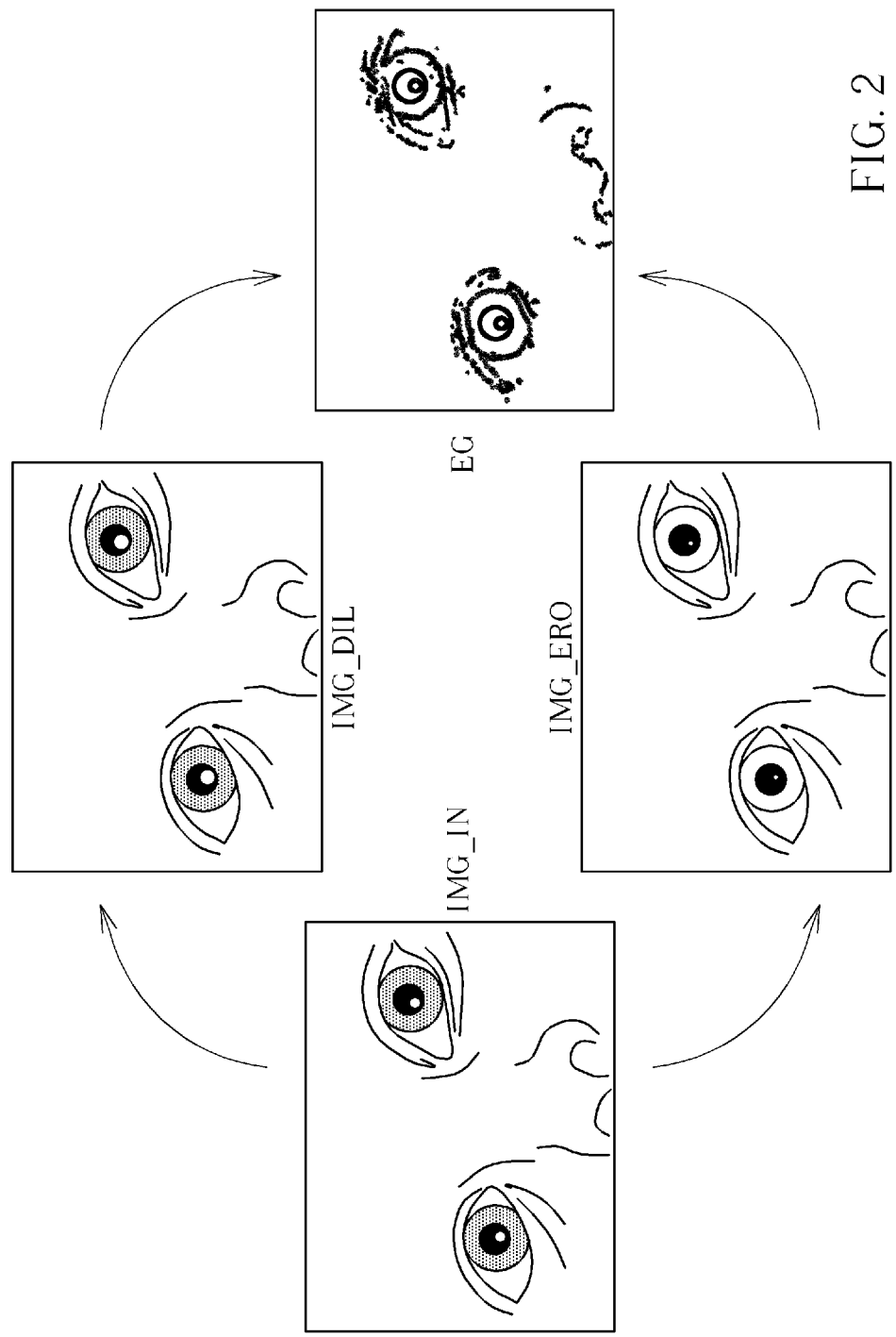
FIG. 2 is a diagram illustrating utilizing an edge detection circuit to process an input image to derive an edge detection result according to an embodiment of the present invention.

The edge detection circuit 1100 will determine the edge detection result EG according to a luminance value of each pixel in the input image IMG_IN and luminance value of pixels surrounding thereof. For example, the edge detection circuit 1100 can perform erosion and dilation processes for the input image IMG_IN, respectively, and utilize the eroded and dilated images to derive the edge detection result EG. Please refer to FIG. 2, which is a diagram illustrating utilizing the edge detection circuit 1100 to process the input image IMG_IN to derive the edge detection result EG according to an embodiment of the present invention. Firstly, the edge detection circuit 1100 will perform an erosion process for pixels within the input image IMG_IN, utilize an erosion mask of a predetermined size (e.g., a pixel matrix of 5×5) to process each pixel in the input image IMG_IN, replace a luminance value of a center pixel in the pixel matrix with a luminance value of the darkest pixel in the matrix, and therefore derive an erosion result IMG_ERO; meanwhile, the edge detection circuit 1100 will perform a dilation process for pixels having higher luminance within the input image IMG_IN, utilize a dilation mask of a predetermined size (e.g., a pixel matrix of 5×5) to process each pixel in the input image IMG_IN, replace a luminance value of a center pixel in the pixel matrix with a luminance value of the brightest pixel in the matrix, and therefore derive a dilation result IMG_DIL. After deriving the erosion result IMG_ERO and the dilation result IMG_DIL, the edge detection circuit 1100 will compare corresponding pixel luminance values in the erosion result IMG_ERO and the dilation result IMG_DIL, wherein when a luminance difference between a pixel in the erosion result IMG_ERO and a corresponding pixel in the dilation result IMG_DIL is larger than a threshold, the edge detection circuit 1100 will label the pixel as an edge pixel, and generate edge detection result EG according to all derived edge pixels after finishing processing the erosion result IMG_ERO and dilation result IMG_DIL. As shown in FIG. 2, the edge detection circuit 1100 can successfully derive images with edge characteristics (including images of eyes). Please note that the aforementioned erosion and dilation processes are utilized as an embodiment of detecting edge characteristics for the present invention, and is not supposed to be a limitation of the present invention. Any other method of detecting edge characteristics to derive edge detection result EG also falls within the scope of the present invention.

Figure 3:
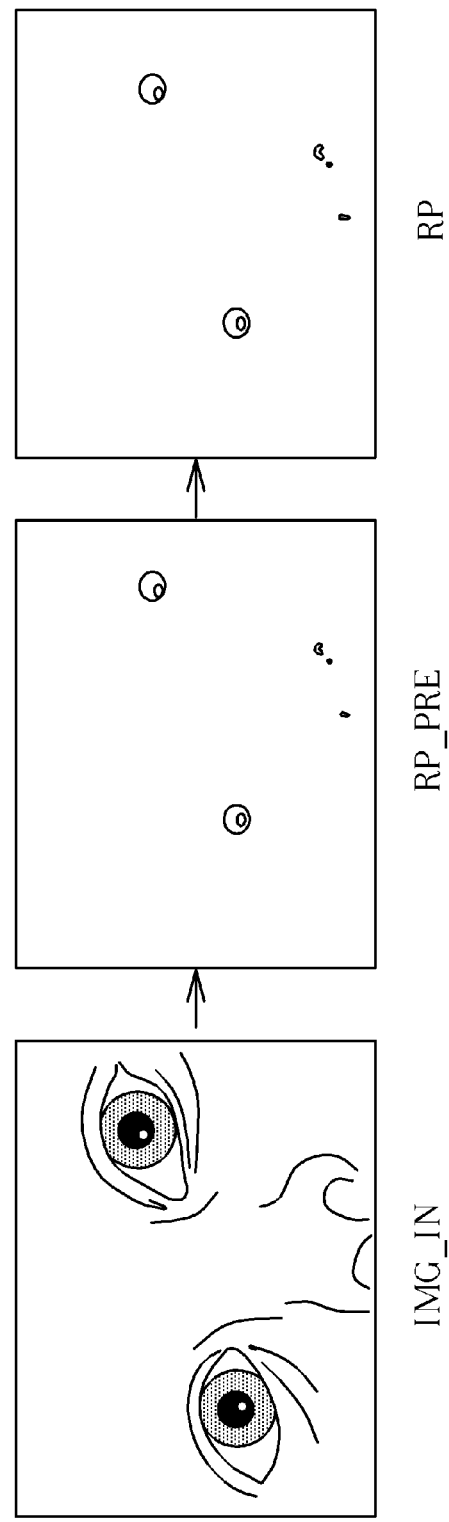
FIG. 3 is a diagram illustrating utilizing a red pixel detection circuit to process an input image to derive a red pixel detection result according to an embodiment of the present invention.

The red pixel detection circuit 1200 will process pixels having red characteristics in the input image IMG_IN. In this embodiment, the red pixel detection circuit 1200 will process according to values of the pixels in an RGB color space. For example, assuming that a pixel has a red color value Rp, a green color value Gp and a blue color value Bp, when the red color value Rp of the pixel is larger than a red threshold Rth, and ratios of the red color value Rp, the green color value Gp and the blue color value Bp of the pixel all meet a predetermined condition (for example, $Rp/(Rp+Gp+Bp) > R_{ratio}$, $Gp/(Rp+Gp+Bp) < G_{ratio}$ and $Bp/(Rp+Gp+Bp) < B_{ratio}$), the red pixel detection circuit 1200 will determine that the pixel is a red pixel having red characteristics. After processing all the pixels, the red pixel detection circuit 1200 will derive a preliminary red pixel detection result RP_PRE; however, the red pixels demonstrated in the preliminary red pixel detection result RP_PRE may appear unnatural due to discontinuities of the red pixels. Thus, the red pixel detection circuit 1200 will further perform a dilation process for the preliminary red pixel detection result RP_PRE to generate a red pixel detection result RP, so as to construct a smoother and more complete image. Please refer to FIG. 3, which is a diagram illustrating utilizing the red pixel detection circuit 1200 to process the input image IMG_IN to derive the red pixel detection result RP according to an embodiment of the present invention. As shown in FIG. 3, the red pixel detection circuit 1200 can successfully derive an image having pupils included therein.

Figure 4:
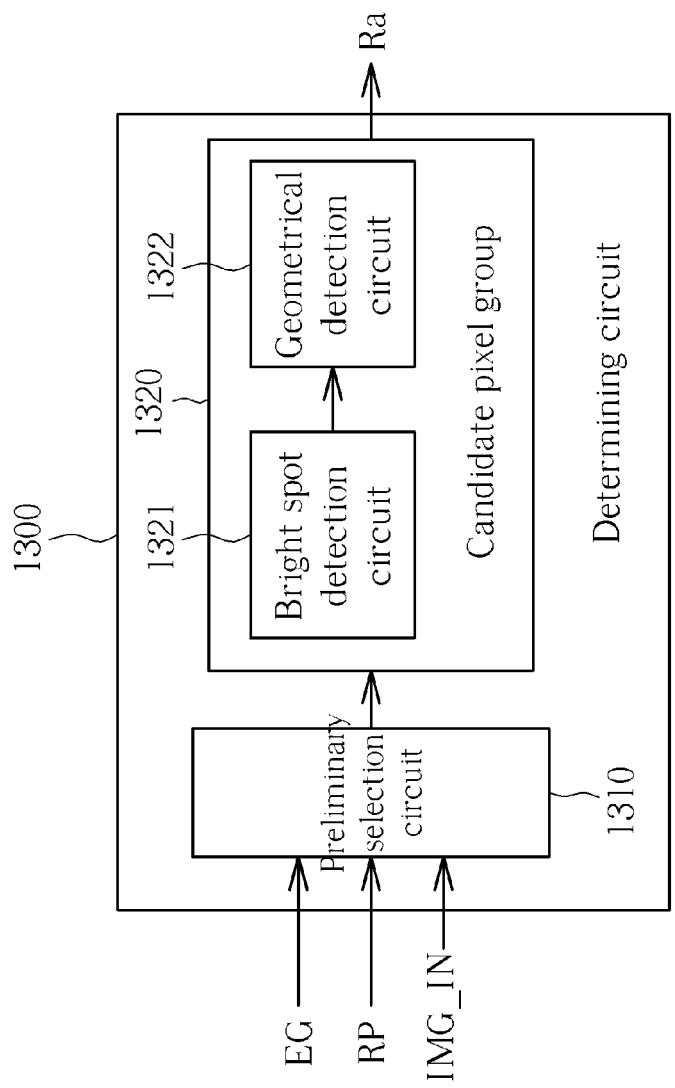
FIG. 4 is a diagram of a determining circuit according to an embodiment of the present invention.
Figure 5:
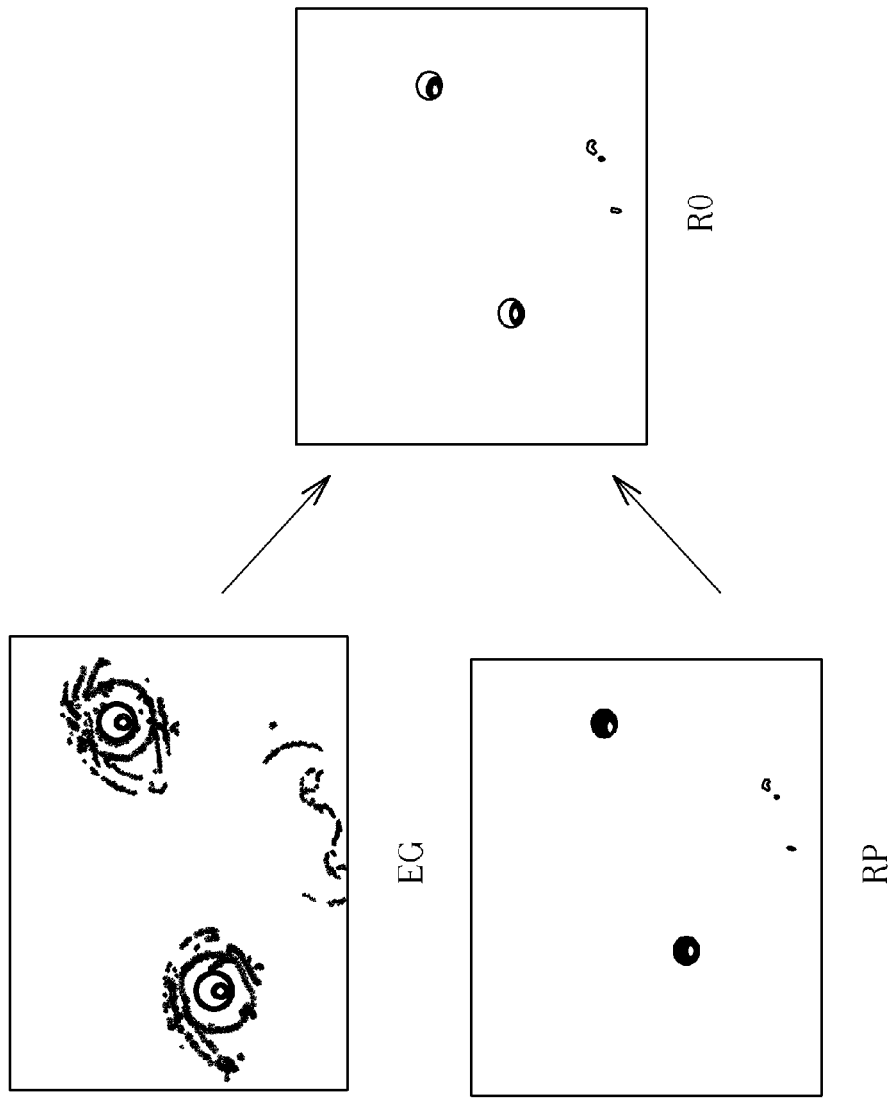
FIG. 5 is a diagram illustrating utilizing a preliminary selection circuit to derive a preliminary detection result based on an edge detection result and a red pixel detection result according to an embodiment of the present invention.
Figure 6:
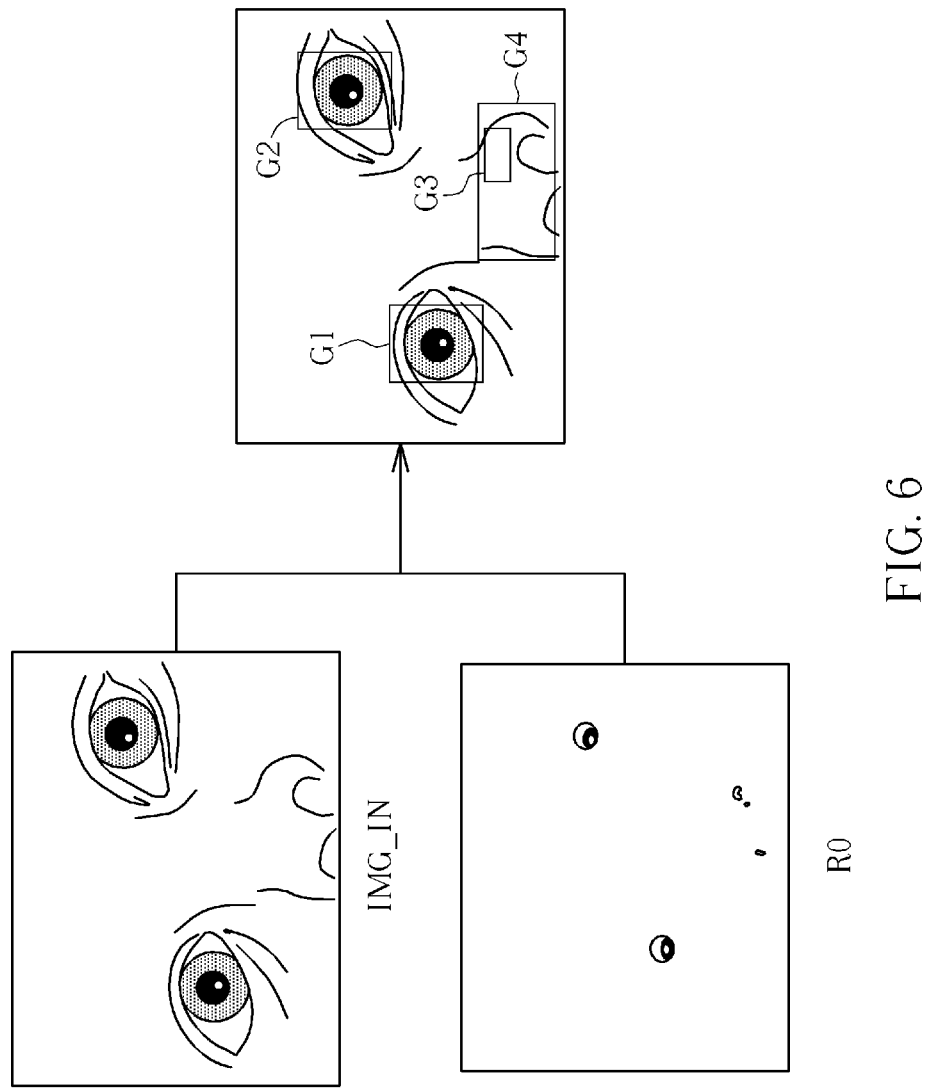
FIG. 6 is a diagram illustrating utilizing a preliminary selection circuit to process an input image to derive candidate pixels groups according to an embodiment of the present invention.

Please refer to FIG. 4, which is a diagram of the determining circuit 1300 according to an embodiment of the present invention. The determining circuit 1300 includes a preliminary selection circuit 1310 and a candidate pixel group detection circuit 1320, wherein the candidate pixel group detection circuit 1320 includes a bright spot detection circuit 1321 and a geometrical detection circuit 1322. The preliminary selection circuit 1310 is for processing the input image IMG_IN according to the edge detection result EG and the red pixel detection result RP to thereby obtain a preliminary detection result R0, and derive at least one candidate pixel group according to the preliminary detection result R0. Please refer to FIG. 5 in conjunction with FIG. 2 and FIG. 3. FIG. 5 is a diagram illustrating utilizing the preliminary selection circuit 1310 to derive the preliminary detection result R0 based on the edge detection result EG and the red pixel detection result RP according to an embodiment of the present invention. In this embodiment, the preliminary selection circuit 1310 performs an intersection of the edge detection result EG and the red pixel detection result RP to derive the preliminary detection result R0. Next, the preliminary selection circuit 1310 will further choose at least one candidate pixel group from the input image IMG_IN, wherein the at least one candidate pixel group covers the pixels corresponding to the preliminary detection result R0 in the input image IMG_IN. In this example, each candidate pixel group is a square image surrounding the image group having both the red pixel characteristics and the edge characteristics. Please refer to FIG. 6, which is a diagram illustrating utilizing the preliminary selection circuit 1310 to process the input image IMG_IN to derive candidate pixels groups G1~G4 according to an embodiment of the present invention. As shown in FIG. 6, the preliminary selection circuit 1310 is able to derive images having eyes (i.e., candidate pixel groups G1 and G2) successfully, and can also derive non-eye images (i.e., candidate pixel groups G3 and G4) which have both the red pixel characteristics and the edge characteristics. Therefore, the preliminary selection circuit 1310 will further eliminate certain misjudgment results according to relative positions of the candidate pixel groups.

Figure 7:
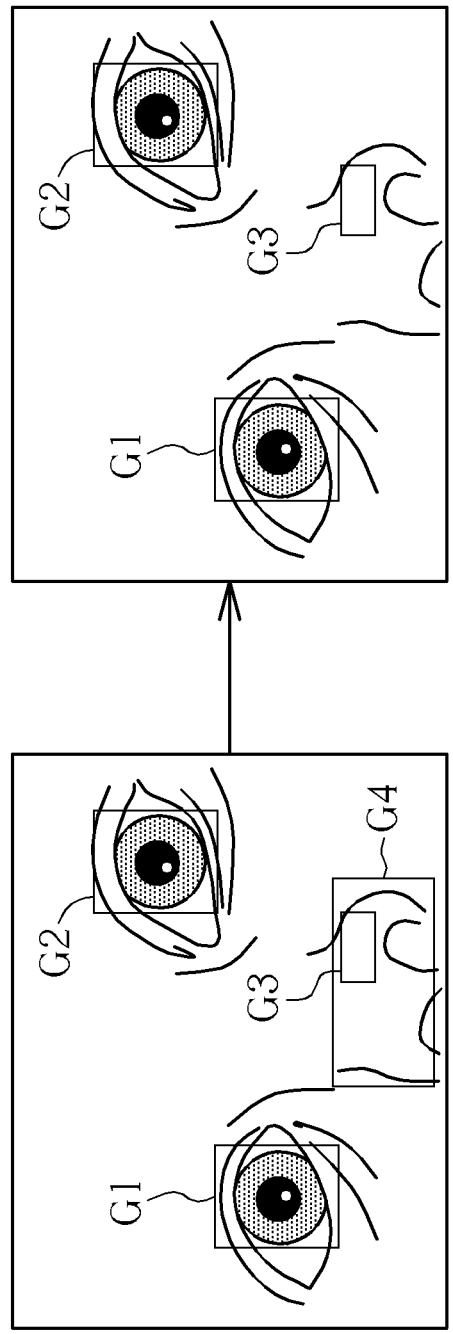
FIG. 7 is a diagram illustrating eliminating misjudgment results based on relative positions of candidate pixel groups according to an embodiment of the present invention.

Please refer to FIG. 7, which is a diagram illustrating using the preliminary selection circuit 1310 to eliminate misjudgment results based on relative positions of the candidate pixel groups according to an embodiment of the present invention. Since an image of each eye will not overlap and eyes usually appear as relatively small objects in general images, the preliminary selection circuit 1310 will check if there is overlapping among the candidate pixel groups, and eliminate the larger candidate pixel group within two overlapping candidate pixel groups. In FIG. 7, the candidate pixel group G3 is located inside the candidate pixel group G4, and the preliminary selection circuit 1310 thereby eliminates the larger candidate pixel group G4, and leaves only the smaller candidate pixel groups G1~G3. However, there still may be misjudgments in the result processed by the preliminary selection circuit 1310, and therefore the candidate pixel group detection circuit 1320 is required to further select from among the candidate pixel groups G1~G3. When a picture is taken in a dark environment, the flash light also induces intense reflection lights on the eyes, and therefore a bright spot is formed in each redeye image. This property can be utilized to perform enhanced selection among the candidate pixel groups G1~G3.

Figure 8:
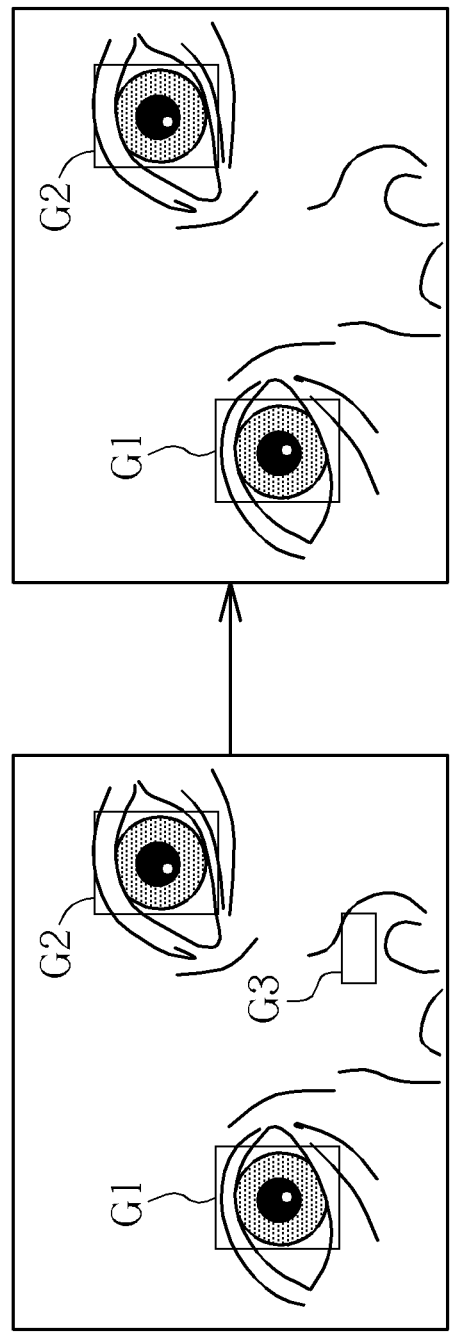
FIG. 8 is a diagram illustrating utilizing a bright spot detection circuit to derive a target pixel group based on luminance values in candidate pixel groups according to an embodiment of the present invention.

The bright spot detection circuit 1321, which is included in the candidate pixel group detection circuit 1320, will process the derived candidate pixel groups (i.e., the candidate pixel groups G1~G3), calculate a maximum value (i.e., a luminance value of the bright spot in the red eye image) of the luminance values of the pixels in each derived candidate pixel group and an average luminance value (i.e., an average luminance value of the red eye image) of the pixels in each candidate pixel group; and when a difference between the maximum value and the average luminance value is larger than a threshold, the bright spot detection circuit 1321 thereby determines that the candidate pixel group is a target pixel group. Please refer to FIG. 8, which is a diagram illustrating utilizing the bright spot detection circuit 1321 to derive the target pixel group based on the luminance values of pixels in the candidate pixel groups according to an embodiment of the present invention. As shown in FIG. 8, the candidate pixel groups G1 and G2 both have relatively high-luminance pixels, and pixels in the candidate pixel groups G3 have no apparent luminance difference; therefore the bright spot detection circuit 1321 will eliminate the candidate group G3, and choose the candidate pixel groups G1 and G2 as target pixel groups.

Figure 9:
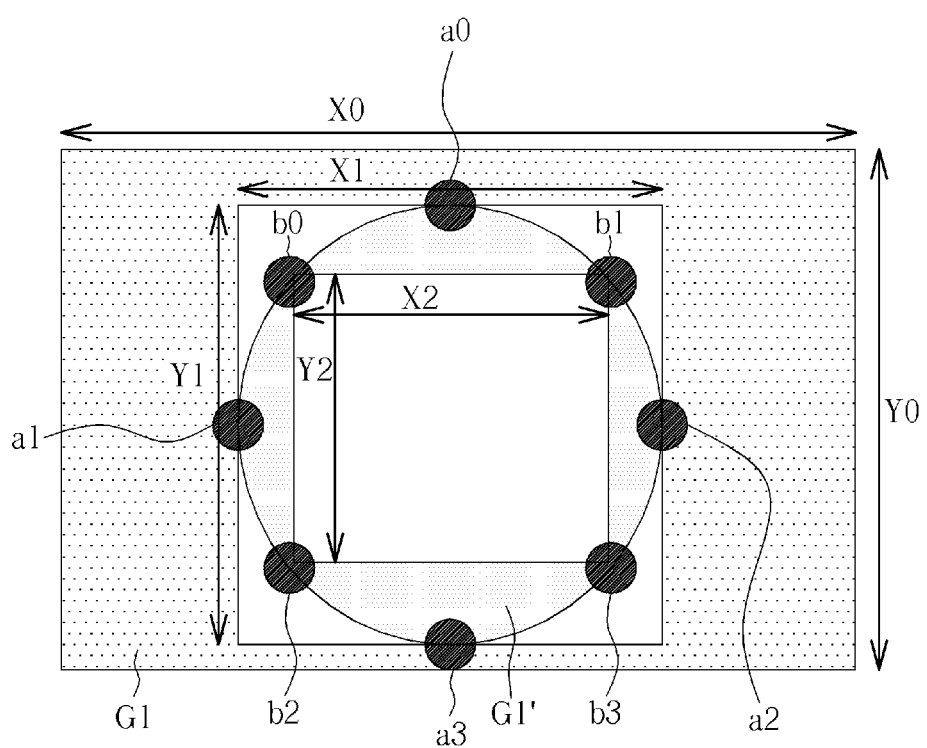
FIG. 9 is a diagram illustrating utilizing a geometrical detection circuit to process a target pixel group according to an embodiment of the present invention.

After deriving the target pixel groups, the candidate pixel group detection circuit 1300 will further perform an advanced selection according to geometrical characteristics of the target pixel groups. For an example of this, please refer to FIG. 9, which is a diagram illustrating utilizing the geometrical detection circuit 1322 to process the geometrical characteristics of the target pixel group G1 according to an embodiment of the present invention. Firstly, the geometrical detection circuit 1322 will derive a pixel group having red pixel characteristics in the target pixel group G1 and define it as a red region G1'. As shown in FIG. 9, the target pixel group G1 is a rectangle of a length X0 and a width Y0. In the red region G1', four pixels a0, a1, a2 and a3, which are located at the top, the top left, top right and the lowest corners, respectively, are utilized to define an external rectangle, and the external rectangle has a length X1 and a width Y1, respectively, and has a center ac (the coordinate of the center ac is a calculated average value of coordinates of a0, a1, a2 and a3). Likewise, four pixels b0, b1, b2 and b3, which are located at the upper left, the upper right, the lower left and the lower right corners of the red region G1', respectively, are utilized to define an internal rectangle, and the internal rectangle has a length X2 and a width Y2, respectively, and has a center bc (the coordinate of the center bc is a calculated average value of coordinates of b0, b1, b2 and b3). By calculating whether a length:width ratio X0/Y0 of the target pixel group G1, a length:width ratio X1/Y1 of the external rectangle, and a length:width ratio X2/Y2 of the internal rectangle are all within a predetermined length:width ratio range, whether a distance between the external rectangle center ac and each peripheral pixel (a0, a1, a2 and a3) is within a predetermined range, and whether a distance between the internal rectangle center bc and each peripheral pixel (b0, b1, b2 and b3) is within a predetermined range, the geometrical detection circuit 1322 can determine the red region G1' in the target pixel group G1 is a red geometrical group (i.e., it may be a redeye image). Please note that, in other embodiments, the geometrical detection circuit 1322 may not necessarily refer to all the length:width ratios and center-to-periphery distances to determine redeye images. That is, the geometrical detection circuit 1322 may refer to one of the length:width ratios and center-to-periphery distances to determine redeye images, or use other geometrical characteristics for making the judgment.

Figure 10:
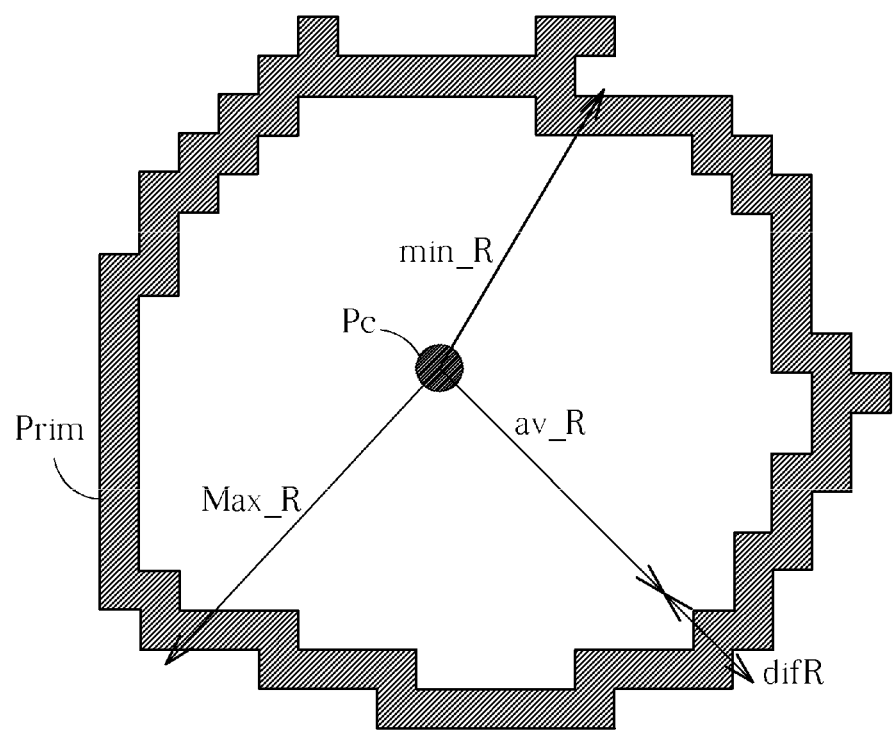
FIG. 10 is a diagram illustrating utilizing a geometrical detection circuit to process geometrical characteristics of a red region according to an embodiment of the present invention.

Via the aforementioned steps, the geometrical detection circuit 1322 may roughly determine whether the red region G1' inside the target pixel group G1 may be a redeye image or not. However, the geometrical detection circuit 1322 in this embodiment will perform further examinations to accurately determine whether the red region G1' is a redeye image. For an example of this, please refer to FIG. 10, which is a diagram illustrating utilizing the geometrical detection circuit 1322 to process geometrical characteristics of the red region G1' according to an embodiment of the present invention. Firstly, the geometrical detection circuit 1322 will derive rim pixels Prim of the red region G1'; in addition, via calculating an average of locations of all rim pixels Prim, the geometrical detection circuit 1322 may obtain a center Pc of the rim pixels Prim. Next, the geometrical detection circuit 1322 calculates distances between the center Pc and all the rim pixels Prim to derive an average distance av_R, a maximum distance max_R and a minimum distance min_R, where an absolute difference between the average distance av_R and each rim pixel Prim is diffR. When the absolute difference between the average distance av_R and each rim pixel Prim, i.e., diffR, is smaller than 15% of the average distance av_R (diffR<av_R*15%), and a ratio of the maximum distance max_R to the minimum distance min_R is smaller than 3 (i.e., max_R/Min_R<3), the geometrical detection circuit 1322 will determine that the geometrical characteristic of the red region G1' is in accordance with a circle, and thereby determine that pixels corresponding to the red region G1' are images of a redeye.

In this embodiment, a red compensation apparatus 1400 is further utilized to compensate the input image IMG_IN according to the detection result Ra after the redeye image detection apparatus 1000 determines redeye images, and therefore a compensated image IMG_COM is derived accordingly. The red compensation apparatus 1400 will check a luminance value and a chrominance value of the redeye image indicated by the detection result Ra. For example, the detection result Ra indicates that a pixel of the redeye image has a luminance value L, and chrominance values a and b in a Lab color space, wherein a highest luminance value of all pixels in the redeye image is Lmax, and a lowest luminance value of all pixels in the redeye image is Lmin. The red compensation apparatus 1400 thereby adjusts the luminance value of the pixel as L'=(L−Lmin)/(Lmax−Lmin). In addition, the red compensation apparatus 1400 also tunes the chrominance values of the pixel. In this embodiment, the red compensation apparatus 1400 adjusts the chrominance values as a'=a*0.3, b'=b*0.3. However, the aforementioned adjustments are only for illustrating an embodiment of the present invention, and are not supposed to be limitations to the present invention. After adjusting the luminance value and chrominance values of the redeye image and thereby deriving an adjusted image IMG_ADJ, the redeye compensation apparatus 1400 will further utilize a Gaussian low pass filter to filter the redeye image apart from the bright spot, and therefore the resultant redeye image appears more visually natural.

In summary, the present invention simultaneously utilizes red pixel and edge detection techniques to provide a detection method and a related apparatus capable of detecting at least one redeye image within an input image easily and quickly. Compared with conventional designs, the present invention omits the facial detection process, and is capable of correctly detecting redeye images when only one eye appears in a face or when detecting animal images.

Those skilled in the art will readily observe that numerous modifications and alterations of the device and method may be made while retaining the teachings of the invention.

What is claimed is:

1. A redeye image detection method for detecting at least one red eye image in an input image, comprising:
    deriving an edge detection result by performing an edge detection process to detect an edge characteristic of the input image, wherein the step of performing the edge detection process comprises:
        performing an erosion process for pixels within the input image, the erosion process including utilizing an erosion mask to process each pixel in the input image, replacing a luminance value of a center pixel in the erosion mask with a luminance value of the darkest pixel in the erosion mask, and deriving an erosion result;
        performing a dilation process for pixels within the input image, the dilation process including utilizing a dilation mask to process each pixel in the input image, replacing a luminance value of a center pixel in the dilation mask with a luminance value of the brightest pixel in the dilation mask, and deriving a dilation result; and
        comparing corresponding pixel luminance values in the erosion result and the dilation result, wherein when a luminance difference between a pixel in the erosion result and a corresponding pixel in the dilation result is larger than a threshold, labeling the pixel as an edge pixel, and generating the edge detection result according to all derived edge pixels;
    deriving a red pixel detection result by performing a red pixel detection process to detect red pixels in the input image; and
    utilizing a determining circuit to derive a preliminary detection result according to the edge detection result and the red pixel detection result, and derive the at least one redeye image according to the preliminary detection result;
    wherein the step of deriving the redeye image according to the preliminary detection result comprises:
        deriving at least one candidate pixel group from the input image according to the preliminary detection result, wherein the at least one candidate pixel group comprises pixels in the input image to which the preliminary detection results corresponds;
        deriving at least one target pixel group according to luminance values of pixels in the at least one candidate pixel group, and the step of deriving the target pixel group according to luminance values of pixels in the candidate pixel group comprises:
            calculating a maximum value of the luminance values of the pixels in the candidate pixel group and an average luminance value of the pixels in the candidate pixel group; and
            determining that the candidate pixel group is the target pixel group when a difference between the maximum value and the average value is larger than a threshold; and
        deriving at least one redeye image according to the at least one target pixel group.

2. The redeye image detection method of claim 1, wherein the step of deriving the at least one target pixel group according to the luminance values of pixels in the candidate pixel group further comprises:
    deriving a geometrical detection result according to a geometrical characteristic of the target pixel group; and
    deriving the redeye image according to the geometrical detection result.

3. The redeye image detection method of claim 2, wherein the step of deriving the geometrical detection result according to the geometrical characteristic of the target pixel group comprises:
    determining a red geometrical group according to a first geometrical characteristic of a red region in the target pixel group; and
    deriving the geometrical detection result according to a second geometrical characteristic of the red geometrical group.

4. The redeye image detection method of claim 3, wherein the first geometrical characteristic comprises one of a length-to-width ratio of the target pixel group, a length-to-width ratio of the red region, a difference between an average length and a length of the red region, and a difference between an average width and a width of the red region.

5. The redeye image detection method of claim 1, further comprising:
    deriving an adjusted red eye image by adjusting the red eye image according to a luminance value of the red eye image; and
    deriving a compensated red eye image by filtering the adjusted red eye image.

6. A redeye image detection apparatus, for detecting at least one red eye image in an input image, comprising:
    an edge detection circuit, coupled to the input image, for deriving an edge detection result by performing an edge detection process to detect an edge characteristic of the input image, wherein the edge detection process includes an erosion process and a dilation process, and the edge detection circuit performs the erosion process and the dilation process for pixels within the input image; the erosion process includes utilizing an erosion mask to process each pixel in the input image, replacing a luminance value of a center pixel in the erosion mask with a luminance value of the darkest pixel in the erosion mask, and deriving an erosion result; the dilation process includes utilizing a dilation mask to process each pixel in the input image, replacing a luminance value of a center pixel in the dilation mask with a luminance value of the brightest pixel in the dilation mask, and deriving a dilation result; and the edge detection circuit compares corresponding pixel luminance values in the erosion result and the dilation result, wherein when a luminance difference between a pixel in the erosion result and a corresponding pixel in the dilation result is larger than a threshold, the edge detection circuit labels the pixel as an edge pixel and generates the edge detection result according to all derived edge pixels;

a red pixel detection circuit, coupled to the input image, for deriving a red pixel detection result by performing a red pixel detection process to detect red pixels in the input image; and a determining circuit, coupled to the edge detection circuit and the red pixel detection circuit, for deriving a preliminary detection result according to the edge detection result and the red pixel detection result, and deriving the at least one redeye image according to the preliminary detection results;

wherein the determining circuit comprises:

a candidate pixel group detection circuit, for deriving at least one candidate pixel group from the input image according to the preliminary detection result, wherein the at least one candidate pixel group comprises pixels in the input image to which the preliminary detection results corresponds, and the candidate pixel group detection circuit derives at least one target pixel group according to luminance values of pixels in the at least one candidate pixel group, and derives at least one redeye image according to the at least one target pixel group, and the candidate pixel group detection circuit comprises:

a bright spot detection circuit, for calculating a maximum value of the luminance values of the pixels in the candidate pixel group and an average luminance value of the pixels in the candidate pixel group, and determining that the candidate pixel group is the target pixel group when a difference between the maximum value and the average luminance value is larger than a threshold.

7. The redeye image detection apparatus of claim 6, wherein the candidate pixel group detection circuit further comprises:

a geometrical detection circuit, for deriving a geometrical detection result according to a geometrical characteristic of the target pixel group, and deriving the redeye image according to the geometrical detection result.

8. The redeye image detection apparatus of claim 7, wherein the geometrical detection circuit determines a red geometrical group according to a first geometrical characteristic of a red region in the target pixel group, and derives the geometrical detection result according to a second geometrical characteristic of the red geometrical group.

9. The redeye image detection apparatus of claim 8, wherein the first geometrical characteristic comprises one of a length-to-width ratio of the target pixel group, a length-to-width ratio of the red region, a difference between an average length and a length of the red region, and a difference between an average width and a width of the red region.

10. The redeye image detection apparatus of claim 6, further comprising:

a redeye compensation apparatus, coupled to the determining circuit, for deriving an adjusted red eye image by adjusting the red eye image according to a luminance value of the red eye image, and deriving a compensated red eye image by filtering the adjusted red eye image.

* * * * *